US008738075B2

(12) United States Patent
Zhang et al.

(10) Patent No.: US 8,738,075 B2
(45) Date of Patent: May 27, 2014

(54) METHODS AND APPARATUS FOR RADIO RESOURCE CONTROL

(75) Inventors: Yi Zhang, Beijing (CN); Robert Zaus, Munich (DE); Woonhee Hwang, Espoo (FI); Lei Du, Beijing (CN); Devaki Chandramouli, Plano, TX (US)

(73) Assignee: Nokia Siemens Networks Oy, Espoo (FI)

( * ) Notice: Subject to any disclaimer, the term of this patent is extended or adjusted under 35 U.S.C. 154(b) by 292 days.

(21) Appl. No.: 13/136,793

(22) Filed: Aug. 10, 2011

(65) Prior Publication Data

US 2013/0040605 A1     Feb. 14, 2013

(51) Int. Cl.
*H04W 72/00*     (2009.01)

(52) U.S. Cl.
USPC ........... 455/555; 455/450; 455/458; 455/434; 455/466; 455/404.1; 455/552.1

(58) Field of Classification Search
USPC .............. 455/450, 458, 434, 466, 432.1, 574, 455/41.1, 421, 404.1, 552.1, 433, 435.1, 455/436, 411, 509; 370/338, 328, 311, 337, 370/319
See application file for complete search history.

(56) References Cited

U.S. PATENT DOCUMENTS

| 2012/0281531 A1* | 11/2012 | Susitaival | 370/230 |
| 2013/0035064 A1* | 2/2013 | Balachandran et al. | 455/411 |
| 2013/0040597 A1* | 2/2013 | Jang et al. | 455/404.1 |

FOREIGN PATENT DOCUMENTS

GB     2443233 A     4/2008

OTHER PUBLICATIONS

Technical Specification Group Services and System Aspects TSGS#27(05)0116 Meeting #27, Mar. 14-17, 2005, Tokyo, Japan.
3GPP TSG—SA2 Meeting #44 Tdoc _S2-050499Budapest, Hungary, Jan. 26-Feb. 2, 2005.*
"$3^{rd}$ Generation Partnership Project; Technical Specification Group Services and System Aspects; Service accessibility (Release 10)", 3GPP TS 22.011 V10.3.0, Mar. 2011, 26 pgs.
"$3^{rd}$ Generation Partnership Project; Technical Specification Group Core Network and Terminals; Non-Access-Stratum (NAS) protocol for Evolved Packet System (EPS); Stage 3 (Release 20) Annex D", 3GPP TS 24.301 V10.2.0, Mar. 2011, 5 pgs.
"$3^{rd}$ Generation Partnership Project; Technical Specification Group Core Network and Terminals; Mobile radio interface Layer 3 specification; Core network protocols; Stage 3 (Release 10) Annex L", 3GPP TS 24.008 V10.2.0, Mar. 2011, 5 pgs.

(Continued)

*Primary Examiner* — Joseph Arevalo
(74) *Attorney, Agent, or Firm* — Harrington & Smith (57) ABSTRACT

Improved systems and techniques for controlling access to network resources. A base station broadcasts extended access barring (EAB) and access class barring (ACB) information. Upon a determination by a user equipment that the user equipment requires service from the base station, the user equipment determines its EAB category and call type. The user equipment receives the EAB and ACB information broadcast by the base station and determines if it is subject to EAB based on its EAB category. If the user equipment is not subject to EAB, the user equipment determines if its call type is subject to ACB and, if the call type is subject to ACB, applies access class barring based on its call type.

20 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, 290 pgs.

"Extended Access Barring for delay tolerant devices", ZTE, 3GPP TSG-RAN WG2 meeting #73bis (R2-1 11918), Apr. 2011, 10 pgs.

"Extended access barring for MTC devices", Ericsson, ST-Ericsson, 3GPP TSG-RAN WG2 #74 (R2-1 13030), May 2011, 3 pgs.

"EAB for RAN overload protection", Intel Corporation, 3GPP TSG RAN WG2 Meeting #74, (R2-113217), May 2011, 4 pgs.

"Further Discussion on EAB", LG Electronics Inc., 3GPP TSG-RAN WG2 #74 (R2-113339), May 2011, 5 pgs.

"RAN mechanisms to avoid CN overload due to Machine-Type Communications", 3GPP™ Work Item Description (RP101026), 5 pgs.

"Adding 2 GHz band LTE for ATC of MSS in North America—perf part", DBSD, Terrestar Network, TSG RAN Meeting #50 (RP-110330), Mar. 2011, 2 pgs.

"Report of the LTE User Plane session", Vice-Chairman, 3GPP TSG-RAN WG2 Meeting #73 (R2-112562), Feb. 2011; 7 pgs.

"3GPP TS 25.331 V10.2.0, Sections 8.1.1.6.3 and 8.1.1.6.4", pp. 48-52, Dec. 2010.

Nokia Siemens Networks et al: "Extended Access Barring for LTE and UMTS", 3GPP Draft; R2-112995 (EAB for LTE-UMTS), 3rd Generation Partnership Project (3GPP), Mobile Competence Centre ; 650, Route Des Lucioles ; F-06921 Sophia-Antipolis Cedex ; France,vol. RAN WG2, no. Barcelona, Spain; 20110509, May 2, 2011, XP050495120,[retrieved on May 2, 2011]the whole document (2 pages).

Telefon AB LM Ericsson et al: "Realizing Extended Access Barring", 3GPP Draft; GP-110355, 3rd Generation Partnership Project (3GPP), Mobile Competence Centre ; 650, Route Des Lucioles ; F-06921 Sophia-Antipolis Cedex ; France, vol. TSG Geran, no. Chengdu; 20110304, Mar. 3, 2011, XP050486659, [retrieved on Mar. 3, 2011] p. 2, paragraph 3.2.2.1-p. 5, paragraph 3.3.1.4 (15 pages).

ZTE: "Clarification on how to control access attempts from UEs configured for EAB", 3GPP Draft; 51-111056, 3rd Generation Partnership Project (3GPP), Mobile Competence Centre ; 650, Route Des Lucioles ; F-06921 Sophia-Antipolis Cedex ; France, vol. SA WGI, no. Xian; 20110509, May. 2, 2011, XP050514741, [retrieved on May 2, 2011] the whole document (2 pages).

Nokia Siemens Networks et al: "Extended Access Barring",3GPP Draft; C1-113093-EAB-Disc, 3rd Generation Partnership Project (3GPP), Mobile Competence Centre ; 650, Route Des Lucioles ; F-06921 Sophia-Antipolis Cedex ; France, vol. CT WGI, no. Malta; 20110822, Aug. 13, 2011, XP050533581, [retrieved on Aug. 13, 2011] the whole document (2 pages).

Zte et al: "Clarification on how EAB is applied in Shared Network", 3GPP Draft; S1-111376, 3rd Generation Partnership Project (3GPP), Mobile Competence Centre ; 650, Route Des Lucioles ; F-06921 Sophia-Antipolis Cedex ; France, vol. SA WG1, no. Xian; 20110509, May 16, 2011, XP050515452, [retrieved on May 16, 2011] the whole document (3 pages).

* cited by examiner

METHODS AND APPARATUS FOR RADIO RESOURCE CONTROL

FIELD OF THE INVENTION

The present invention relates generally to wireless communication. More particularly, the invention relates to systems and techniques for managing load on a wireless network.

BACKGROUND

One of the greatest problems facing wireless network operators is the need to serve large numbers of customers with varying needs using the infrastructure available to them. Operators of wireless networks and, indeed, most systems serving large numbers of customers, have long observed that loads nearing or exceeding the capacity of a network typically result not from the average demand presented by the users, but from peak demand resulting from simultaneous requests for service from a relatively large proportion of their user population.

Wireless networks use a number of techniques to manage their peak loads, and one mechanism that can be used as the danger of congestion increases is the temporary denial of service to various users. A base station, such as an eNodeB may broadcast signals indicating that particular users are to be excluded from making connection request. For example, the 3GPP defines standards for access class barring (ACB), in which each UE is a member of one or more access classes and User equipments (UEs) may be configured to recognize data broadcast by an eNodeB excluding their access class. 3GPP technical specification 22.011 V10.3.0 recognizes 16 access classes. Every UE is a member of one of the classes 0-9, and the classes 11-15 are reserved for UEs belonging to special categories, such as public utilities or emergency service providers. Each UE belonging to the classes 11-15 is also a member of one of the classes 0-9.

When the network needs to control the number of UEs accessing the network, it broadcasts a message indicating the current barring rate commonly applicable for classes 0-9 and a flag designating barred or unbarred status for each of classes 11-15. When a UE in one of classes 0-9 needs access to the network, it draws a random number and compares it to the current barring rate. An access attempt is allowed or not based on the comparison. If the access attempt is not allowed, further attempts are barred for a time period that is calculated based on the mean duration of access control provided by the network and the random number drawn by the UE.

The 3G Partnership Project is also discussing Extended Access Barring (EAB), which would exclude devices subject to EAB under circumstances in which other devices would be unaffected, or for timer periods longer than those applicable to devices subject to ACB.

Substantial numbers of devices that are more or less delay tolerant exist in the service areas of wireless networks. A relatively new class of users, that is, machine type communication (MTC) devices, exist in large numbers throughout the service areas of wireless networks. Many MTC devices monitor significant events such as earthquakes or other natural disasters, and the occurrence of such an event is likely to trigger activity by a great many MTC devices, which will record data and transmit the data to a host. Earthquake monitoring devices, for example, might detect and record earthquake forces and then request network service to transmit the data to a host, with the host eventually performing analysis of the data received from MTC devices distributed throughout the region affected by the earthquake. Such MTC devices typically require service for a short duration and most may not actually need service at the exact time the event occurs. However, it is also true that MTC devices do not have awareness of other demands on the network and the communication necessary to give them that information would impose an unnecessary load on the network.

Many events that would trigger requests for service by MTC devices would also give rise to more urgent demands for service, such as by emergency responders and persons requiring assistance. Network operators wish to insure that service will be available to persons having urgent need and, indeed, to ordinary non-urgent usage to the extent possible, without needing to contend with an excessive load caused by the sudden requests for service of possibly huge numbers of MTC devices seeking to upload data to a host, particularly when the devices do not even need to upload their data at any particular time.

Therefore, protocols for relatively extended denial of service are being developed. The 3GPP has agreed that if the core network (CN) is overloaded, an eNodeB associated with the core network can set an extended wait timer based on a "delay tolerant access" parameter of the RRC establishment cause, so that a UE that is to be subjected to an extended wait time, such as a delay tolerant UE, may be barred from access reattempts for a longer time period than is typical in the case of ordinary access class barring. Such a delay period may be, for example, up to 30 minutes.

Discussions are underway for the development of protocols for such extended denial of service. Such protocols are being referred to as extended access barring, or EAB.

According to 3GPP technical specification (TS) 22.011 v10.3, EAB has the following requirements:

A network may broadcast EAB information.
EAB information shall define whether EAB applies to UEs within one of the following categories:
  a) UEs that are configured for EAB;
  b) UEs that are configured for EAB and are neither in their HPLMN nor in a PLMN that is equivalent to it;
  c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN If a UE that is configured for EAB initiates an emergency call or is a member of an Access Class in the range 11-15 and according to clause 4.3.1 that Access Class is permitted by the network, then the UE shall ignore any EAB information that is broadcast by the network.

A UE configured for EAB shall use its allocated Access Class(es), as defined in sub-clause 4.2, when evaluating the EAB information that is broadcast by the network, in order to determine if its access to the network is barred.

If the network is not broadcasting the EAB information, the UE shall be subject to access barring as described in clause 4.3.1

If the EAB information that is broadcast by the network does not bar the UE, the UE shall be subject to access barring as described in clause 4.3.1.

If the UE will not be subject to EAB, the UE should apply normal access class barring based on its access class. In addition, if no EAB information is being broadcast, such as on the broadcast control channel (BCCH), the UE should apply normal access class barring.

Access class is applied based on the call type in evolved UMTS terrestrial radio access network (E-UTRAN) or on the RRC establishment cause in UTRAN. In E-UTRAN, the non-access stratum (NAS) indicates the call type and the RRC establishment cause to the access stratum (AS), and in UTRAN, the NAS indicates the RRC establishment cause to the AS.

The interface between the NAS and the AS is a UE internal interface, and standardized mapping is applied between a specific NAS signalling procedure. The call type and RRC establishment provided by NAS to the AS is standardized in normative annexes in 3GPP technical specifications 24.301 (Annex D) and 24.008 (Annex L). The following is an example extracted from Annex D.

TABLE D.1.1

Mapping of NAS procedure to establishment cause and call type

| NAS procedure | RRC establishment cause (according 3GPP TS 36.331 [22]) | Call type |
|---|---|---|
| Attach | If an ATTACH REQUEST has EPS attach type not set to "EPS emergency attach", the RRC establishment cause shall be set to MO signalling except when the UE initiates attach procedure to establish emergency bearer services. (See Note 1) | "originating signalling" |
| | If an ATTACH REQUEST has EPS attach type not set to "EPS emergency attach" and UE is configured for NAS signalling low priority, the RRC establishment cause shall be set to Delay tolerant. (See Note 1) | "originating signalling" |
| | If an ATTACH REQUEST has EPS attach type set to "EPS emergency attach" or if the ATTACH REQUEST has EPS attach type not set to "EPS emergency attach" but the UE initiates the attach procedure on receiving request from upper layer to establish emergency bearer services, the RRC establishment cause shall be set to Emergency call. (See Note 1) | "emergency calls" |

Note 1:
For these NAS procedures initiated by UEs of access class 12, 13 or 14 in their home country, the RRC establishment cause will be set to "High priority access AC 11-15". For this purpose the home country is defined as the country of the MCC part of the IMSI, see 3GPP TS 22.011 [1A].
For these NAS procedures initiated by UE of access class 11 or 15 in their HPLMN (if the EHPLMN list is not present or is empty) or EHPLMN (if the EHPLMN list is present), the RRC establishment cause will be set to "High priority access AC 11-15".
Note 2:
This is not applicable for mobile terminating 1xCS fallback.

SUMMARY OF THE INVENTION

In a first embodiment of the invention, a method comprises configuring at least one processor to cause an apparatus to perform the functions of, upon a determination that the apparatus needs to communicate with a wireless networking base station, determining an extended access barring category of the apparatus and an access class barring call type of the communication, receiving extended access barring category information broadcast by the base station, receiving access class barring information broadcast by the base station, determining if the communication is subject to extended access barring, and, upon a determination that the apparatus is not subject to extended access barring, determining whether the apparatus is subject to access class barring based on the access class barring information broadcast by the base station.

In another embodiment of the invention, an apparatus comprises at least one processor and a computer readable memory storing a program of instructions. The instructions, when executed by the processor, configure the apparatus to perform the functions of, upon a determination that the apparatus needs to communicate with a wireless networking base station, determining an extended access barring category of the apparatus and an access class barring call type of the communication, receiving extended access barring category information broadcast by the base station, receiving access class barring information broadcast by the base station, determining if the communication is subject to extended access barring, and, upon a determination that the apparatus is not subject to extended access barring, determining whether the apparatus is subject to access class barring based on the access class barring information broadcast by the base station.

In a further embodiment of the invention, a computer readable memory stores a program of instructions. Execution of the instructions by a processor causes an apparatus to perform the functions of, upon a determination that the apparatus needs to communicate with a wireless networking base station, determining an extended access barring category of the apparatus and an access class barring call type of the communication, receiving extended access barring category information broadcast by the base station, receiving access class barring information broadcast by the base station, determining if the communication is subject to extended access barring, and, upon a determination that the apparatus is not subject to extended access barring, determining whether the apparatus is subject to access class barring based on the access class barring information broadcast by the base station.

These and other embodiments and aspects are detailed below with particularity.

DETAILED DESCRIPTION

The requirements detailed above, as well as other requirements, and various problems associated with meeting the requirements and with ACB and EAB in general, are solved by aspects of the present invention, of which exemplary embodiments are described below.

The present invention recognizes that the approaches detailed above do not provide specific mechanisms for EAB. For example, the provisions of Annex D quoted above specify that and, further, that for both include a provision instructing the UE how to apply ordinary access class barring in cases in which a UE is configured for EAB, but EAB is not broadcast by the network or the UE passes EAB. The messages detailed above, as well as other messages defined in various applicable 3GPP technical specifications, do not include parameters indicating the specific signalling indicating that the UE is to use to apply EAB. The present invention also recognizes that it is important to insure that a UE receives the information needed to apply ordinary access class barring if it passes EAB or if EAB information is not broadcast. Specifically, the UE needs to know whether to apply access class barring for mobile originating-signalling (MO-signalling) or mobile originating-data (MO-data). Network operators do not wish to inadvertently privilege MTC or other delay tolerant devices because such devices do not happen to be subject to EAB at any particular time. In addition, if devices configured for EAB are unable to apply access class barring when they are not subject to EAB at a particular time, one logical response of network operators to this situation is to broadcast EAB information so that all devices configured for EAB are subject to EAB whenever access class barring is applied.

Embodiments of the present invention therefore provide mechanisms to provide information to a UE so that a UE that is configured for EAB will, if it passes EAB or if there is no EAB information broadcast, also have or receive information needed to properly apply access class barring.

Figure 1:
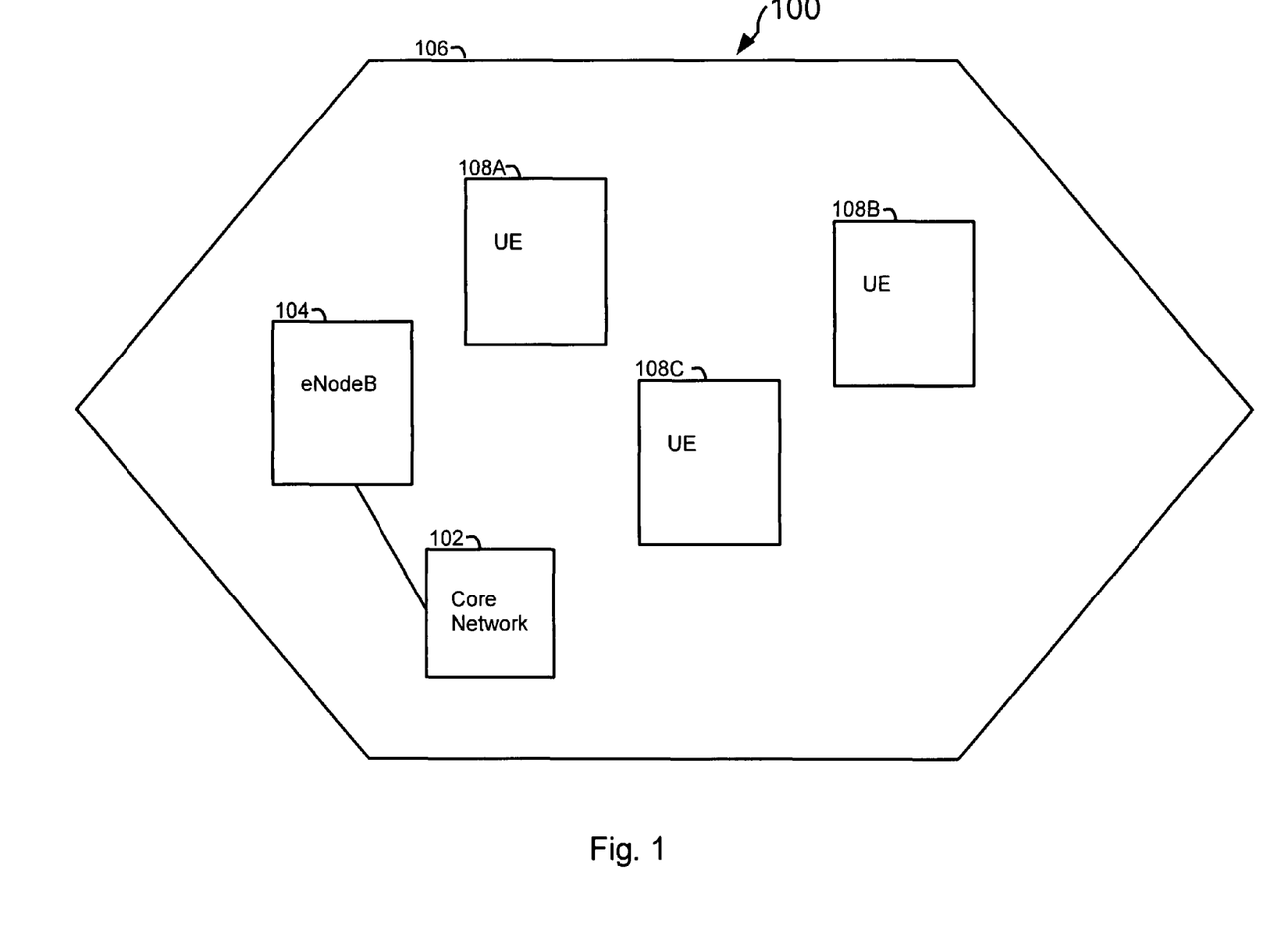
FIG. 1 illustrates a wireless network according to an embodiment of the present invention.

FIG. 1 illustrates an exemplary wireless network 100 according to an embodiment of the present invention. The network 100 comprises a core network 102 and a base station, here implemented as an evolved node B, or eNodeB 104. The eNodeB 104 serves a cell 106, in which a plurality of UEs such as the UEs 108A-108C may request service from the eNodeB 104. In order to avoid excessive loads on the core network, the eNodeB 104 may receive commands from the core network 102 instructing imposition of overload control. The eNodeB 104 may suitably respond to such commands by broadcasting EAB information, including parameters such as acBarringFactor and/or acBarringtime. The eNodeB 104 accomplishes ACB and EAB by broadcasting appropriate messages. In one exemplary embodiment, the UE performs operations defined by the non-access stratum (NAS) of the wireless telecommunications protocol stack being used by the UE, such as the E-UTRAN or the UTRAN protocol stack, with the NAS providing information defining the call type and the establishment cause to the AS. This information is based on the information broadcast by the eNodeB, and is used by the AS to define how to properly apply both ACB and EAB. The information provided by the NAS suitably indicates the type of ACB being applied, typically designated by the ACB call type, as well as the EAB parameters.

According to various exemplary embodiments of the invention, access class barring comprises one of three categories. These categories are barring for emergency, barring for MO-signalling, and barring for MO-data. In various exemplary embodiments detailed below, the eNodeB 104 therefore provides information enabling a determination as to whether the UE 108A is subject to EAB, and also enabling the AS to apply the proper ACB call type if the UE 108A is not subject to EAB.

Figure 2:
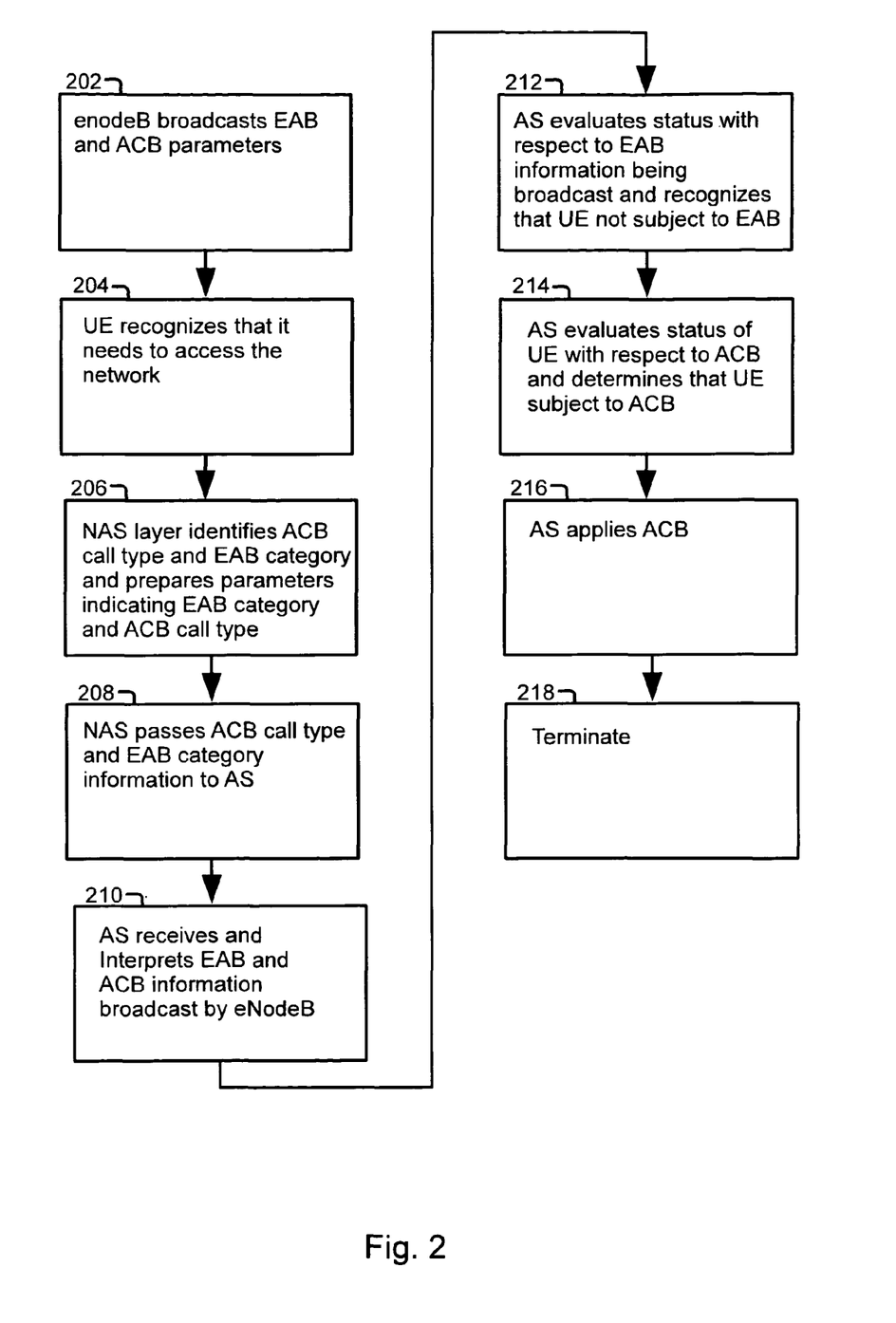
FIG. 2 illustrates a process according to an embodiment of the present invention.

FIG. 2 illustrates a process for determining whether a UE is subject to EAB and ACB according to an embodiment of the invention. In the following discussion, the process is described as being implemented through operations of the eNodeB 104 and the UE 108A, but it will be recognized that the reference to specific devices is non-limiting and exemplary only.

At step 202, the eNodeB 104 broadcasts category "b" EAB parameters and MO-signalling ACB parameters. According to the requirements of TS22.011 detailed above, EAB falls into one of three categories, "a", "b", and "c". Category "a" is the most restrictive, barring all UEs configured for EAB. Category "b" bars all UEs that are not in their home network or an equivalent network and category "c" bars all UEs that are roaming in a non-preferred network as listed on their SIM or USIM. The information broadcast at step 202 by the eNodeB 104 indicates parameters for both EAB and ACB, which may be interpreted by the UE 108A using separate parameters for EAB category and ACB call type. That is, mechanisms according to this embodiment of the present invention define a parameter indicating both whether the UE 108A is configured for EAB and the applicable category if the UE 108 is configured for EAB. In parallel, an ACB call type may be defined indicating the call types, if any, that are subject to ACB. The ACB call type may suitably be defined, for example, as in 3GPP technical specifications 24.301 referred to above.

At step 204, the UE 108A recognizes that it needs to access the network 100. Embodiments of the present invention recognize that simply adding a new call type, such as "EAB category 'a'" or the like, would properly exclude UEs in the EAB category being broadcast, but if a UE was not subject to EAB under the broadcast category, it would not have sufficient information to apply normal access class barring.

At step 206, the NAS layer of the UE 108A identifies its EAB category and also identifies its ACB call type. The UE 108A is operating in its home network, and so belongs to category "a". That is, it is a device configured for EAB, but is subject to EAB only under circumstances in which all UEs not making an emergency request for service. The call type is MO-signalling. The determination of the category is performed by the NAS, because the category depends on the relationship of the UE 108A to the network 100 to which the UE 108A is attempting to gain access, and this operation is part of the NAS functionality. The NAS thus prepares two parameters, one for the EAB category and one for the ACB call type. In the present example, the EAB category indicator identifies the category as category "a" and the ACB call type indicator identifies the call type as MO-signalling. At step 208, then, the NAS passes EAB category and ACB call type information, together with the radio resource control (RRC) establishment cause, to the access stratum (AS) layer, in the form of a first parameter of "EAB category 'a'" and a second parameter of "MO-signalling"

At step 210, at the AS, the UE 108A interprets the information broadcast by the eNodeB 104, recognizing that the eNodeB 104 is broadcasting an EAB parameter indicating category "b" and an ACB call type parameter indicating MO-signalling. At step 212, the AS evaluates its status with respect to the EAB information being broadcast and recognizes that it is not subject to EAB because it has received the information from the NAS that it belongs to category "a". At step 214, because the UE 108A has passed EAB, that is, the AS has determined that the UE 108A is not subject to EAB, the AS evaluates the status of the UE 108A with respect to ACB, and determines that the UE 108A is subject to ACB for the current call type. At step 216, the AS then applies access class barring as described above, that is, by drawing a random number and determining whether the UE 108A is barred or not and for how long based on the random number, the access class of the UE 108A, and the barring rate and other applicable information broadcast by the eNodeB 104. The process then terminates at step 218.

Figure 3:
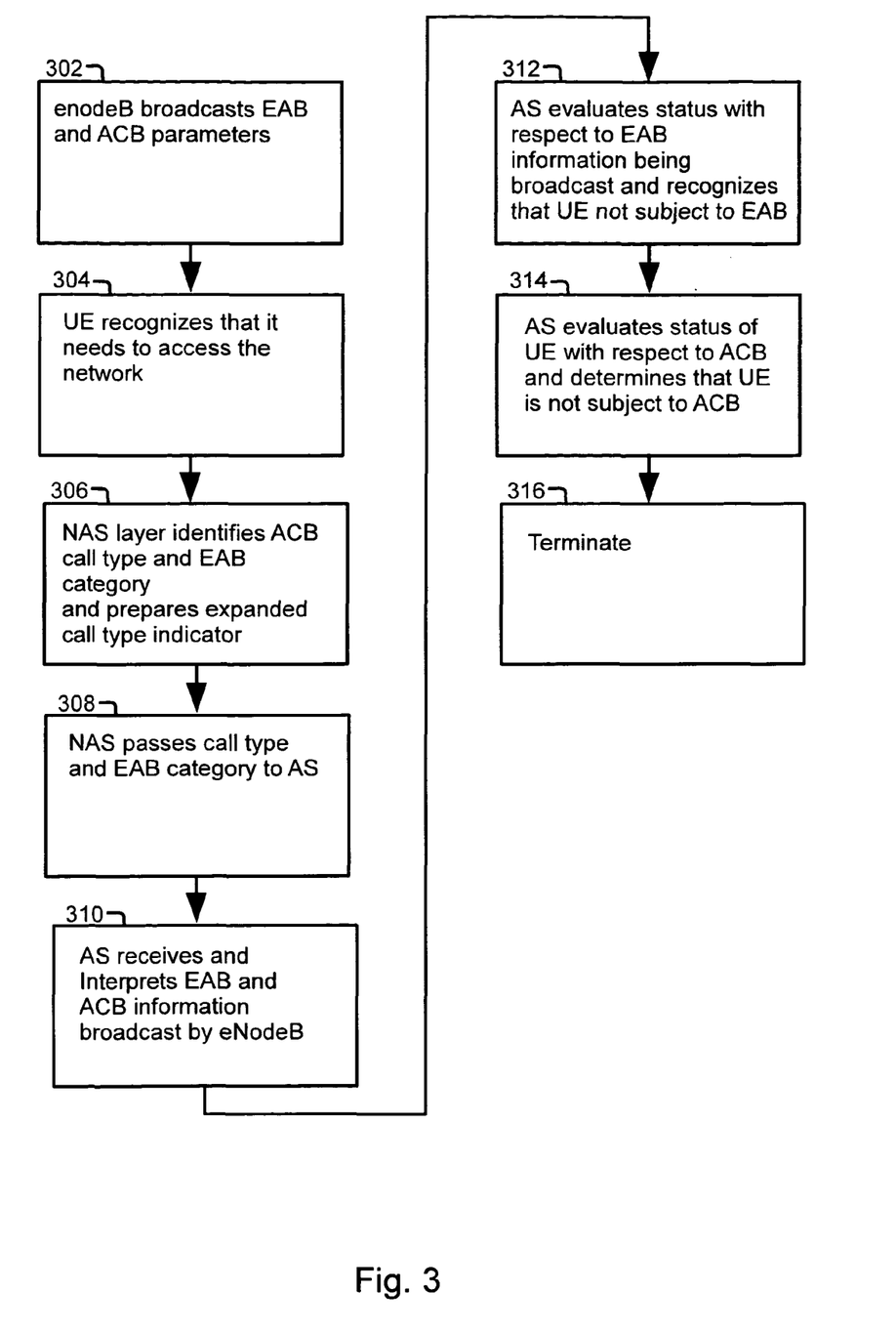
FIG. 3 illustrates a process according to an alternative embodiment of the present invention.

FIG. 3 illustrates the steps of a process 100 according to an alternative embodiment of the invention. The process 100 may suitably be carried out using a network such as the network 100 of FIG. 1. In the following discussion, the process is described as being implemented through operations of the eNodeB 104 and the UE 108B, but it will again be recognized that the reference to specific devices is non-limiting and exemplary only.

At step 302, the eNodeB 104 broadcasts category "b" EAB parameters and MO-data ACB parameters in the same manner as described above with respect to step 202 of FIG. 2. At step 304, the UE 108B recognizes that it needs to access the network 100. At step 306, the NAS layer of the UE 108B identifies its EAB category and also identifies its ACB call type. Again, the UE 108B is operating in its home network, and so belongs to category "a". In the present example, suppose the call type is MO-data. In the exemplary embodiment presented here, rather than preparing dual call type indicators, the NAS prepares what may be thought of as an expanded call type indicator, one providing both the EAB category and the ACB call type. At step 308, then, the NAS passes EAB category and ACB call type information, together with the radio resource control (RRC) establishment cause, to the access stratum (AS) layer, suitably in the form of a call type of "MO-data+EAB category "a".

At step 310, at the AS, the UE 108B interprets the information broadcast by the eNodeB 104, recognizing that the eNodeB 104 is broadcasting an EAB parameter indicating category "b" and an ACB call type parameter indicating MO-data. At step 312, the AS evaluates its status with respect to the EAB information being broadcast and recognizes that it is not subject to EAB because it has received the information from the NAS that it belongs to category "a". At step 314, because the UE 108B has passed EAB, AS evaluates the status of the UE 108B with respect to ACB, and determines that the UE 108B is not subject to ACB for the current call type. The process then terminates at step 316.

Numerous types of devices exist, and many devices, particularly machine type communication devices, are only configured to operate in one particular way. For example, a device may be configured to request service using only MO-data or MO-signalling, and may not have or need a capability to select one or the other at different times.

Figure 4:
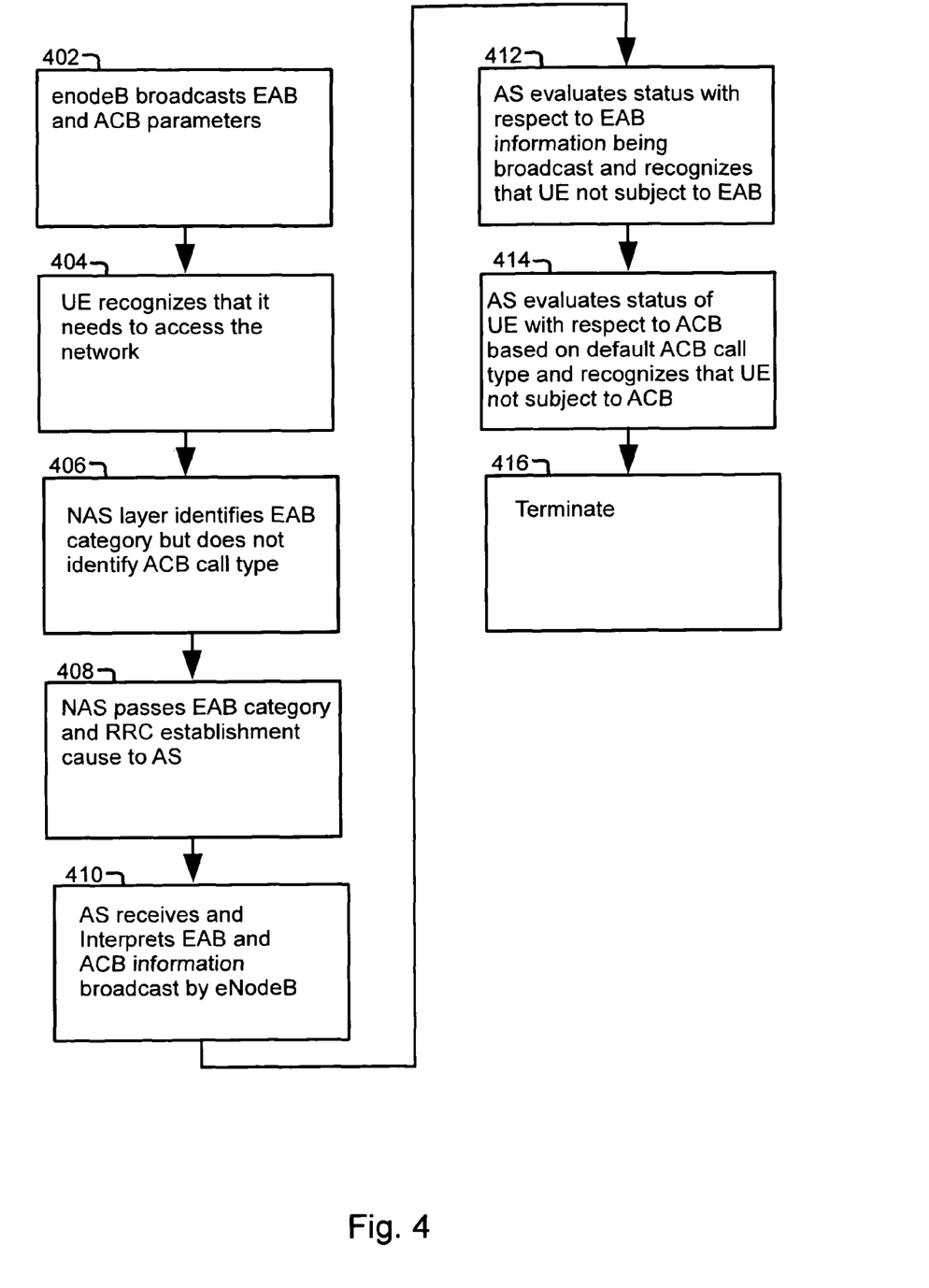
FIG. 4 illustrates a process according to an alternative embodiment of the present invention.

FIG. 4 illustrates the steps of a process 400 according to still another alternative embodiment of the invention. The process 400 provides for a device to simply default to one ACB call type or another after passing EAB. Again, the process 400 may suitably be carried out using a network such as the network 100 of FIG. 1. In the following discussion, the process is described as being implemented through operations of the eNodeB 104 and the UE 108A, but it will again be recognized that the reference to specific devices is non-limiting and exemplary only.

At step 402, the eNodeB 104 broadcasts category "b" EAB parameters and MO-data ACB parameters in the same manner as described above with respect to step 202 of FIG. 2. At step 404, the UE 108A recognizes that it needs to access the network 100. At step 406, the NAS layer of the UE 108A identifies its EAB category, but does not identify its ACB call type. Again, the UE 108A is operating in its home network, and so belongs to category "a". At step 408, the NAS passes EAB category information, together with the radio resource control (RRC) establishment cause, to the access stratum (AS) layer, suitably in the form of a call type of EAB category "a". The NAS does not need to pass ACB call type information to the AS.

At step 410, at the AS, the UE 108A interprets the information broadcast by the eNodeB 104, recognizing that the eNodeB 104 is broadcasting an EAB parameter indicating category "b" and an ACB parameter of MO-signalling. At step 412, the AS evaluates its status with respect to the EAB information being broadcast and recognizes that it is not subject to EAB because it has received the information from the NAS that it belongs to category "a". At step 414, because the UE 108A has passed EAB, the AS evaluates the status of the UE 108A with respect to ACB based on a default call type to be applied if the UE 108A passes EAB. In the present example, suppose that this default call type is MO-data. Because the parameter being broadcast by the eNodeB 104 includes a parameter of MO-signalling, the UE 108A is not subject to ACB for the current call type. The process then terminates at step 416.

Exemplary implementations of NAS operations performed by the processes 200, 300, and 400, respectively, may be represented by the following exemplary descriptions of NAS operations. Exemplary NAS operations that may employ embodiments of the present invention include but are not limited to attach procedures, tracking area updates, service requests, attach procedures, and numerous other NAS operations. The procedure illustrated here is modified from the procedures described above so as to present the extended capabilities of the various embodiments of the invention. It can be seen that each procedure provides mechanisms to be used in cases in which the UE needs emergency communication services. In such cases, the EAB and ACB analyses are suitably not carried out. Instead, standard procedures for emergency attachment may be used.

| NAS procedure | RRC establishment cause | Call type (for ACB) | Call type (for EAB) |
|---|---|---|---|
| Attach | If an ATTACH REQUEST has EPS attach type not set to "EPS emergency attach", the RRC establishment cause shall be set to MO signalling except when the UE initiates attach procedure to establish emergency bearer services. (See Note 1) | "originating signalling" | EAB and/or category a). |
| ... | ... | | ... |

The above procedure provides specifications for performing the ATTACH procedure as detailed above with respect to FIG. 2. The parameter indicating whether EAB is to be applied, and the category if EAB is applied, is here referred to as an EAB call type, but it will be recognized that the reference to the parameter as a call type is exemplary and non-limiting. The procedure provides for the NAS to designate a call type for ACB, and an additional parameter, separate from the ACB call type, for EAB, with the parameters being defined to allow the AS to properly interpret the status of the UE.

| NAS procedure | RRC establishment cause | Call type |
|---|---|---|
| Attach | If an ATTACH REQUEST has EPS attach type not set to "EPS emergency attach", the RRC establishment cause shall be set to MO signalling except when the UE initiates attach procedure to establish emergency bearer services. (See Note 1) | "originating signalling" + EAB category a). |
| ... | ... | ... |

The above procedure provides specifications for performing the ATTACH procedure as detailed above with respect to FIG. 3. The procedure provides for the NAS to use a single call type, with the call type using modified semantics as compared to the ATTACH procedure described above. Again, this call type provides sufficient information to allow the AS to determine the status of the UE.

| NAS procedure | RRC establishment cause (according 3GPP TS 36.331 [22]) | Category (For EAB) |
|---|---|---|
| Attach | If an ATTACH REQUEST has EPS attach type not set to "EPS emergency attach", the RRC establishment cause shall be set to MO signalling except when the UE initiates attach procedure to establish emergency bearer services. (See Note 1) | "a", "b" or "c" |
| ... | ... | ... |

The above procedure provides specifications for performing the ATTACH procedure as detailed above with respect to FIG. 4, simply providing the EAB category without identifying the ACB call type. Rather than relying on the NAS layer to identify the ACB call type, the AS simply implements a default call type so that there is no need for a call type identification for ACB.

Figure 5:
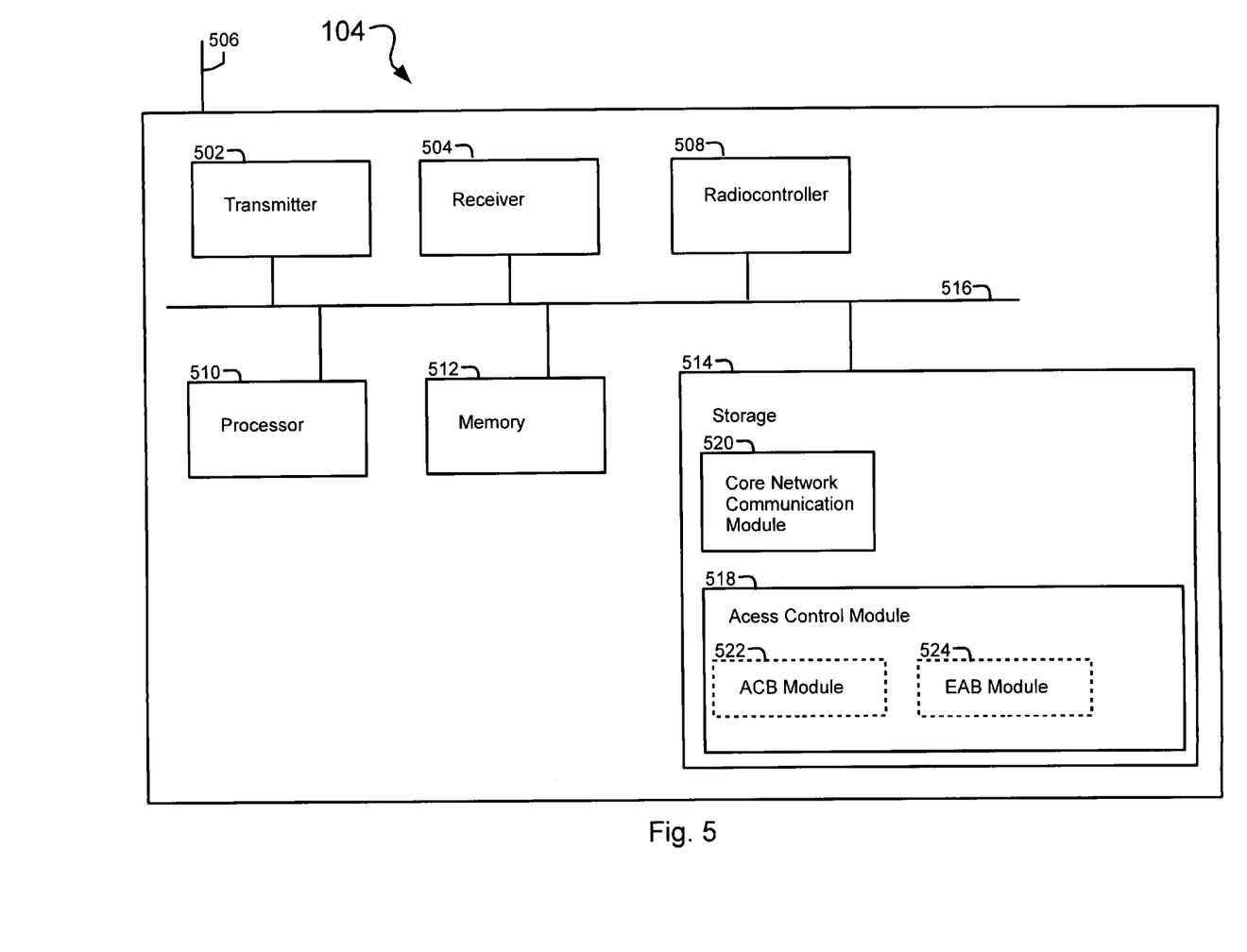
FIG. 5 illustrates a base station according to an embodiment of the present invention.

FIG. 5 illustrates additional details of the eNodeB 104. It will be recognized that a typical network will include numerous base stations, including eNodeBs that may vary from the eNodeB 104 presented here, and may include base stations that are not eNodeBs. It will also be recognized that the present description is in simplified form, focusing on the components needed to carry out embodiments of the present invention.

The eNodeB 104 suitably comprises a transmitter 502, a receiver 504, and one or more antennas, represented here as an antenna 506. The eNodeB 104 may also include a radio-controller 508 configured to control the transmitter 502 and the receiver 504. The eNodeB 104 may also include a processor 510, memory 512, and storage 514, communicating with one another and with the radiocontroller 508 over a bus 516. The eNodeB 104 may suitably employ an access control module 518, implemented as software residing in storage 514 and transferred to memory 512 as needed for execution by the processor 510, as well as a core network communication module 520. The access control module 518 may comprise an access class barring (ACB) module 522 and an extended access barring (EAB) module 524. When the core network 102 is overloaded, it may transmit instructions to base stations such as the eNodeB 104 to implement one or more desired forms of access control. The core network communication module 520 may respond to such instructions by directing either or both of the ACB module 522 and the EAB module 524 to broadcast ACB or EAB parameters, as appropriate. In addition, the eNodeB 104 may broadcast EAB information, ACB information, or both, without instructions from the core network 102, in cases in which the eNodeB itself is overloaded or in danger of overload.

Figure 6:
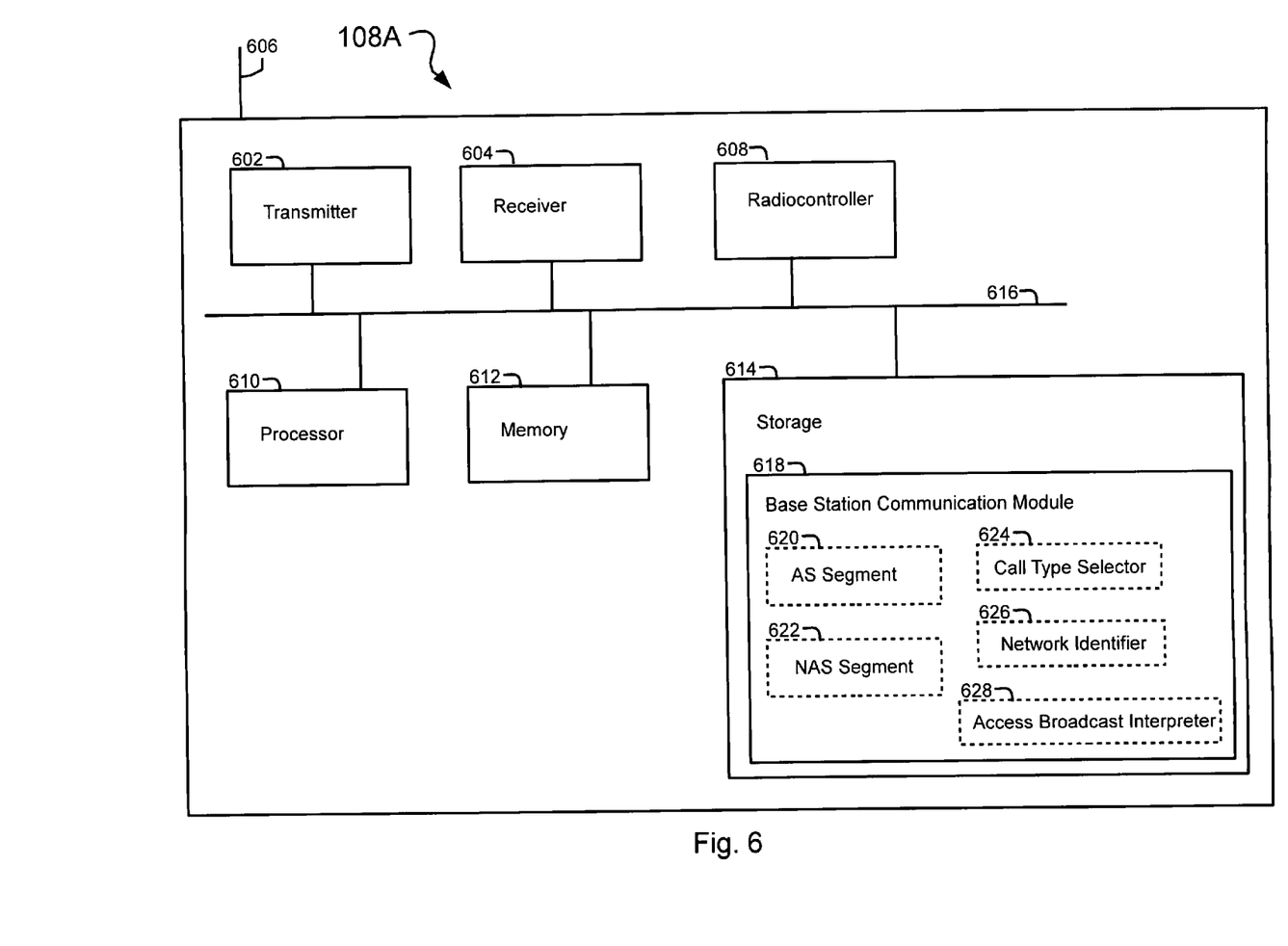
FIG. 6 illustrates a user equipment according to an embodiment of the present invention.

FIG. 6 illustrates additional details of the UE 108A, presented here as an example. It will be recognized that a network such as the network 100 will typically include a large number of UEs, such as the 108B, and 108C, and additional UEs, and that any or all of these UEs which may include similar components to those of the UE 108A, and may also include alternative or additional components as needed to perform their functions.

The UE 108A suitably similarly comprises a transmitter 602, a receiver 604, and one or more antennas, represented here as an antenna 606. The UE 108A may also include a radiocontroller 608 configured to control the transmitter 602 and the receiver 604. The UE 108A may also include a processor 610, memory 612, and storage 614, communicating with one another and with the radiocontroller 608 over a bus 616. The UE 108A may suitably implement a base station communication module 618, which may suitably comprise various segments that implement the wireless telecommunications protocol stack, most notably for present purposes an access stratum segment 620 and a non-access stratum segment 622. The base station communication module 618 may also comprise a call type selector 624, a network identifier 626, and an access broadcast interpreter 628. The network identifier 626 recognizes the network in which the UE 108A is operating in order to allow for determination if the UE 108A is operating in its home network, is roaming in a preferred network, or is roaming in a non-preferred network. The base station communication module 618 performs activities needed to manage various processes similar to the processes 200, 300, and 400, of FIGS. 2, 3, and 4, respectively. For example, when the UE 108A needs to request service, the call type selector 624 and the network identifier 626 may provide to the non-access stratum segment 622 information related to the home network, preferred network, and roaming status of the UE. This information allows the non-access stratum to identify the category of the UE 108A and the call type. The non-access stratum segment 622 provides category and call type information to the access stratum segment 620, allowing the access stratum segment 620 to respond appropriately to information provided by the access broadcast interpreter 628, which examines access information broadcast by the eNodeB 104. The access stratum segment 620 interprets this information in light of the category and call type information provided by the non-access stratum segment 622 and controls the UE 108A appropriately.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. A method comprising:
configuring at least one processor to cause an apparatus to perform the functions of:
upon a determination that the apparatus needs to communicate with a wireless networking base station, determining an extended access barring category of the apparatus and an access class barring call type of the communication;
receiving extended access barring category information broadcast by the base station;
receiving access class barring information broadcast by the base station;
determining, based at least in part on the extended access barring category information broadcast by the base station, whether the apparatus is subject to extended access barring; and
if it is determined that the apparatus is not subject to extended access barring, then, following that determination, proceeding to determine, based on the access class barring information broadcast by the base station, whether the apparatus is subject to access class barring.

2. The method of claim 1, wherein the determination of the extended access barring category of the apparatus is carried out at the non-access stratum layer of the wireless telecommunication protocol stack being used by the UE.

3. The method of claim 2, wherein the non-access stratum layer conveys the extended access barring category and the access class barring call type to the access stratum layer of the wireless telecommunication protocol stack using a first parameter indicating the extended access barring category and a second parameter indicating the access class barring call type.

4. The method of claim 2, wherein the non-access stratum layer conveys the extended access barring category and the access class barring call type to the access stratum layer of the wireless telecommunication protocol stack using an extended call type indicator, wherein the extended call type indicator provides information indicating both the extended access barring category and with the access class barring call type.

5. The method of claim 2, wherein the non-access stratum layer conveys the extended access barring category to the access stratum layer using a parameter indicating an extended access barring category and wherein the access stratum layer selects a default access class barring call type upon receiving an indication that the apparatus is not subject to extended access barring.

6. The method of claim 2, wherein the non-access stratum layer initiates processing of a request for attention upon the determination that the apparatus needs to communicate with the base station.

7. The method of claim 2, wherein, if the need for service from the base station results from a need for an emergency communication, the non-access stratum performs emergency procedures without determining the extended access barring category.

8. An apparatus comprising:
 at least one processor;
 a computer readable memory storing a program of instructions which, when executed by the processor, configure the apparatus to perform the functions of:
  upon a determination that the apparatus needs to communicate with a wireless networking base station, determining an extended access barring category of the apparatus and an access class barring call type of the communication;
  receiving extended access barring category information broadcast by the base station;
  receiving access class barring information broadcast by the base station;
  determining, based at least in part on the extended access barring category information broadcast by the base station, whether the apparatus is subject to extended access barring; and
  if it is determined that the apparatus is not subject to extended access barring, then, following that determination, proceeding to determine, based on the access class barring information broadcast by the base station, whether the apparatus is subject to access class barring.

9. The apparatus of claim 8, wherein the determination of the extended access barring category of the apparatus is carried out at the non-access stratum layer of the wireless telecommunication protocol stack being used by the UE.

10. The apparatus of claim 9, wherein the non-access stratum layer conveys the extended access barring category and the access class barring call type to the access stratum layer of the wireless telecommunication protocol stack using a first parameter indicating the extended access barring category and a second parameter indicating the access class barring call type.

11. The apparatus of claim 9, wherein the non-access stratum layer conveys the extended access barring category and the access class barring call type to the access stratum layer of the wireless telecommunication protocol stack using an extended call type indicator, wherein the extended call type indicator provides information indicating both the extended access barring category and the access class barring call type.

12. The apparatus of claim 9, wherein the non-access stratum layer conveys the extended access barring category to the access stratum layer using parameter indicating an extended access barring category and wherein the access stratum layer selects a default access class barring call type upon receiving an indication that the apparatus is not subject to access class barring.

13. The apparatus of claim 9, wherein the non-access stratum layer initiates processing of a request for attention upon the determination that the apparatus needs to communicate with the base station.

14. The apparatus of claim 9, wherein, if the need for service from the base station results from a need for an emergency communication, the non-access stratum performs emergency procedures without determining the extended access barring category.

15. A computer readable memory comprising a program of instructions, execution of which by a processor causes an apparatus to perform the functions of:
 upon a determination that the apparatus needs to communicate with a wireless networking base station, determining an extended access barring category of the apparatus and an access class barring call type of the communication;
 receiving extended access barring category information broadcast by the base station;
 receiving access class barring information broadcast by the base station;
 determining, based at least in part on the extended access barring category information broadcast by the base station, whether the apparatus is subject to extended access barring; and
 if it is determined that the apparatus is not subject to extended access barring, then, following that determination, proceeding to determine, based on the access class barring information broadcast by the base station, whether the apparatus is subject to access class barring.

16. The computer readable memory of claim 15, wherein the determination of the extended access barring category of the apparatus is carried out at the non-access stratum layer of the wireless telecommunication protocol stack being used by the UE.

17. The computer readable memory of claim 15, wherein the non-access stratum layer conveys the extended access barring category and the access class barring call type to the access stratum layer of the wireless telecommunication protocol stack using a first parameter indicating the extended access barring category and a second parameter indicating the access class barring call type.

18. The computer readable memory of claim 15, wherein the non-access stratum layer conveys the extended access barring category and the access class barring call type to the access stratum layer of the wireless telecommunication protocol stack using an extended call type indicator, wherein the extended call type indicator provides information indicating both the extended access barring category and the access class barring call type.

19. The computer readable memory of claim 15, wherein the non-access stratum layer conveys the extended access barring category to the access stratum layer using a parameter indicating an extended access barring category and wherein the access stratum layer selects a default access class barring call type upon receiving an indication that the apparatus is not subject to extended access barring.

20. The computer readable memory of claim 15, wherein the non-access stratum layer initiates processing of a request for attention upon the determination that the apparatus needs to communicate with the base station.

* * * * *